US009812044B1

(12) United States Patent
Yousef

(10) Patent No.: US 9,812,044 B1
(45) Date of Patent: Nov. 7, 2017

(54) PROGRAMMABLE LED SIGN

(71) Applicant: Amid A. Yousef, N. Royalton, OH (US)

(72) Inventor: Amid A. Yousef, N. Royalton, OH (US)

(*) Notice: Subject to any disclaimer, the term of this patent is extended or adjusted under 35 U.S.C. 154(b) by 0 days.

(21) Appl. No.: 15/232,344

(22) Filed: Aug. 9, 2016

Related U.S. Application Data

(60) Provisional application No. 62/203,480, filed on Aug. 11, 2015.

(51) Int. Cl.
| | |
|---|---|
| *H04N 5/765* | (2006.01) |
| *H04N 5/775* | (2006.01) |
| *G09F 21/04* | (2006.01) |
| *H05B 33/08* | (2006.01) |
| *G09G 5/00* | (2006.01) |
| *G09G 3/12* | (2006.01) |
| *G09F 13/22* | (2006.01) |
| *G09F 7/18* | (2006.01) |

(52) U.S. Cl.
CPC ............ *G09F 21/04* (2013.01); *G09F 7/18* (2013.01); *G09F 13/22* (2013.01); *G09G 3/12* (2013.01); *G09G 5/006* (2013.01); *H05B 33/0845* (2013.01); *G09F 2007/1865* (2013.01); *G09F 2013/222* (2013.01); *G09F 2013/227* (2013.01); *G09G 2370/00* (2013.01)

(58) Field of Classification Search
CPC .. G09F 21/04; G09F 13/22; G09F 2007/1865; H05B 33/0845; G09G 5/006; G09G 3/12; G09G 7/18; G09G 2370/00; G09G 2013/222; G09G 2013/227

USPC ................. 386/231, 230, 200, 342
See application file for complete search history.

(56) References Cited

U.S. PATENT DOCUMENTS

| | | | |
|---|---|---|---|
| 4,929,936 A | 5/1990 | Friedman et al. | 345/618 |
| 8,797,235 B2 | 8/2014 | Koebrich et al. | 345/1.3 |
| 8,890,770 B2 | 11/2014 | Koebrich et al. | 345/1.3 |
| 2006/0101034 A1* | 5/2006 | Murphy | G06Q 10/10 |
| 2014/0184471 A1* | 7/2014 | Martynov | G06F 3/1423 345/1.2 |

* cited by examiner

*Primary Examiner* — Robert Chevalier
(74) *Attorney, Agent, or Firm* — Alvin T. Rockhill

(57) ABSTRACT

A LED sign which can be programmed to display a desired message can be made utilizing a sign kit comprising (1) one or more faces, wherein each face is comprised of a plurality light emitting diodes; (2) a receiver having erasable, programmable read-only memory and a USB printer port plug; (3) a power supply; and (4) a USB flash drive which is adapted to connecting to the receiver through the USB printer port plug; wherein the USB flash drive is programmed to reset the erasable, programmable read-only memory of the receiver by erasing any preexisting data which may reside in the read-only memory of the receiver and to program the erasable, programmable read-only memory with auto executing script to set the desired message to be displayed. The LED sign can be mounted on a trailer for display as the sign is moving or for display in a stationary location.

20 Claims, 9 Drawing Sheets

PROGRAMMABLE LED SIGN

This application claims benefit of U.S. Provisional Patent Application Ser. No. 62/203,480, filed on Aug. 11, 2015. The teachings of U.S. Provisional Patent Application Ser. No. 62/203,480 are incorporated herein by reference in their entirety.

BACKGROUND OF THE INVENTION

Signs are widely used in advertising, for promotional purposes, and to provide needed information. Signs which have LED (light emitting diode) displays have come into common use in recent years. Such LED signs offer the advantage of being capable of being quickly reprogrammed to display different messages or images as desired. They also can be programmed to display video and/or multiple messages which are displayed sequentially. LED signs are aesthetically pleasing and can be easily observed in low light environments, such as outdoors at night.

Conventional LED signs have a number of significant drawbacks even though they offer an array of positive attributes. For instance, conventional LED signs can be bulky and heavy which makes transporting them to a desired location difficult and costly. They also require a computer to run to display which they are presenting. Programming the computer can be confusing and requires a knowledge base which many users do not possess. The computer needed for use in conjunction with such conventional LED signs can also be the source of a variety of problems and is frequently to cause of sign failure. For example, problems can arise from loss of electricity, overheating, mismatching of screen resolutions, rebooting errors, virus, and physical damage resulting from the elements, such as rain, snow, hail, and wind damage. Hackers and pranksters have also been known to re-program the message being displayed on computer-driven LED signs so as to destroy the intended message and replace it with a new one which can be malicious and embarrassing.

These has been a long felt need for LED signs which can be easily transported to a desired location via a common carrier, such as by truck or by air, and easily assembled for use at that desired location. There is also a need for LED signs which can be transported and displayed on a trailer which can be pulled behind a vehicle, such as a car, a tractor, or a truck, and displayed as the trailer is moving or parked in a desired location. There has also been a desire to eliminate the need for a computer in the operation of LED signs to reduce cost, improve reliability, and minimize the risk of malicious tampering with the sign.

SUMMARY OF THE INVENTION

The LED signs of this invention are light weight and can be shipped as component parts which are compact and easily transportable via common carriers, such as on an airplane. The components parts can be sold and transported as a kit which can be easily assembled at a desired location. In one embodiment of the subject invention the LED sign can be mounted on a truck bed or on a trailer for display as the sign is moving or for display in a desired location or a series of desired locations. In another embodiment of this invention, the need for a computer in driving the sign display is eliminated. This accordingly makes the LED sign unit less costly, more reliable, and less susceptible to the malicious acts of hackers and pranksters.

The subject invention more specifically discloses a sign kit which can be assembled into a sign which can be programmed to display a user defined message, said sign kit being comprised of (1) one or more faces, wherein each face is comprised of a plurality of light emitting diodes; (2) a receiver having erasable, programmable read-only memory and a USB printer port plug; (3) a power supply; and (4) a USB flash drive (dongle) which is adapted to connecting to the receiver through the USB printer port plug; wherein the USB flash drive (dongle) is programmed to reset the erasable, programmable read-only memory of the receiver by erasing any preexisting data which may reside in the read-only memory of the receiver and to program the erasable, programmable read-only memory with auto executing script to set the user defined message to be displayed. In this embodiment of the invention the USB flash drive (dongle) is programmed to set the size and the brightness of the user defined message to be displayed. In another embodiment of this invention the USB flash drive (dongle) sequentially loads data into the erasable, programmable read-only memory of the receiver for auto-play allowing for the USB flash drive (dongle) to be removed from USB printer port plug with the user defined message continuing to be displayed until reprogrammed with a second USB flash drive (dongle) which provides a second user defined message. The USB flash drive (dongle) can be a computer flash drive.

The present invention also reveals a mobile sign display kit which can be assembled into a mobile sign display, wherein said mobile sign display kit is comprised of (1) one or more faces, wherein each face is comprised of a plurality of light emitting diodes; (2) a receiver having erasable, programmable read-only memory and a USB printer port plug; (3) a power supply; (4) a USB flash drive (dongle) which is adapted to connecting to the receiver through the USB printer port plug; wherein the USB flash drive (dongle) is programmed to reset the erasable, programmable read-only memory of the receiver by erasing any preexisting data which may reside in the read-only memory of the receiver and to program the erasable, programmable read-only memory with auto executing script to set the user defined message to be displayed, (5) an O-mount which is adapted for being affixed to a trailer, and (6) 2 U-mounts which are adapted for being affixed to the trailer.

The subject invention also discloses a sign unit which can be programmed to display a user defined message, said sign unit being comprised of (i) one or more sign faces, (ii) a receiver, (iii) a power supply, and (iv) a USB flash drive (dongle); wherein the sign faces include a data bus, wherein the receiver includes a receiver buss, wherein the data bus of each of the sign faces is electrically connected to the receiver buss through a computer ribbon, wherein the receiver is electrically connected to a power supply, wherein the USB flash drive (dongle) which is adapted to connecting to the receiver through the USB printer port plug; wherein the USB flash drive (dongle) is programmed to reset the erasable, programmable read-only memory of the receiver by erasing any preexisting data which may reside in the read-only memory of the receiver and to program the erasable, programmable read-only memory with auto executing script to set the user defined message to be displayed.

DETAILED DESCRIPTION OF THE INVENTION

Figure 1:
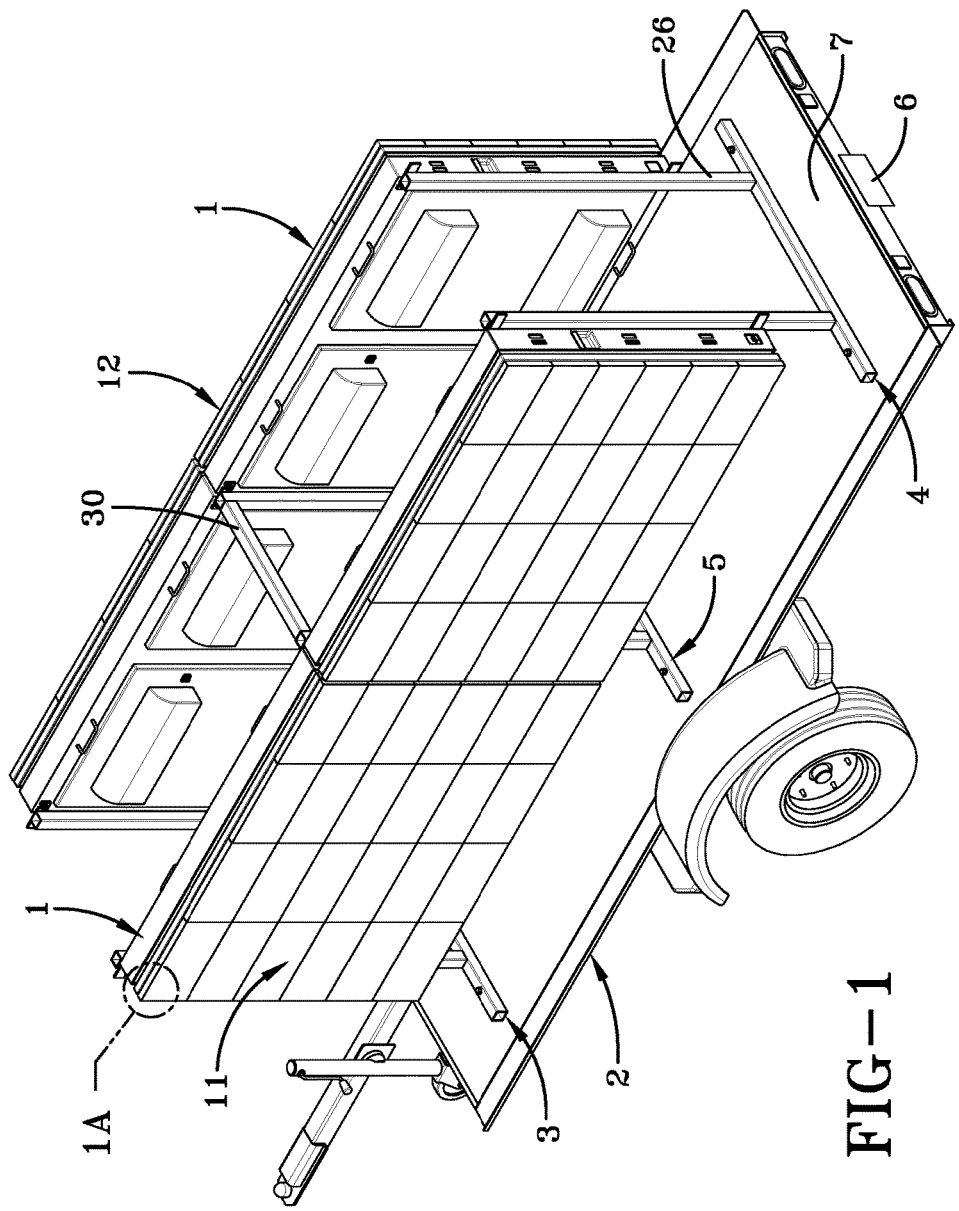
FIG. 1 is a perspective view of an LED sign of this invention which is affixed to a trailer which has a license plate. The trailer shown has a trailer hitch for attachment to a vehicle, such as an automobile, a truck, or a van.
Figure 1A:
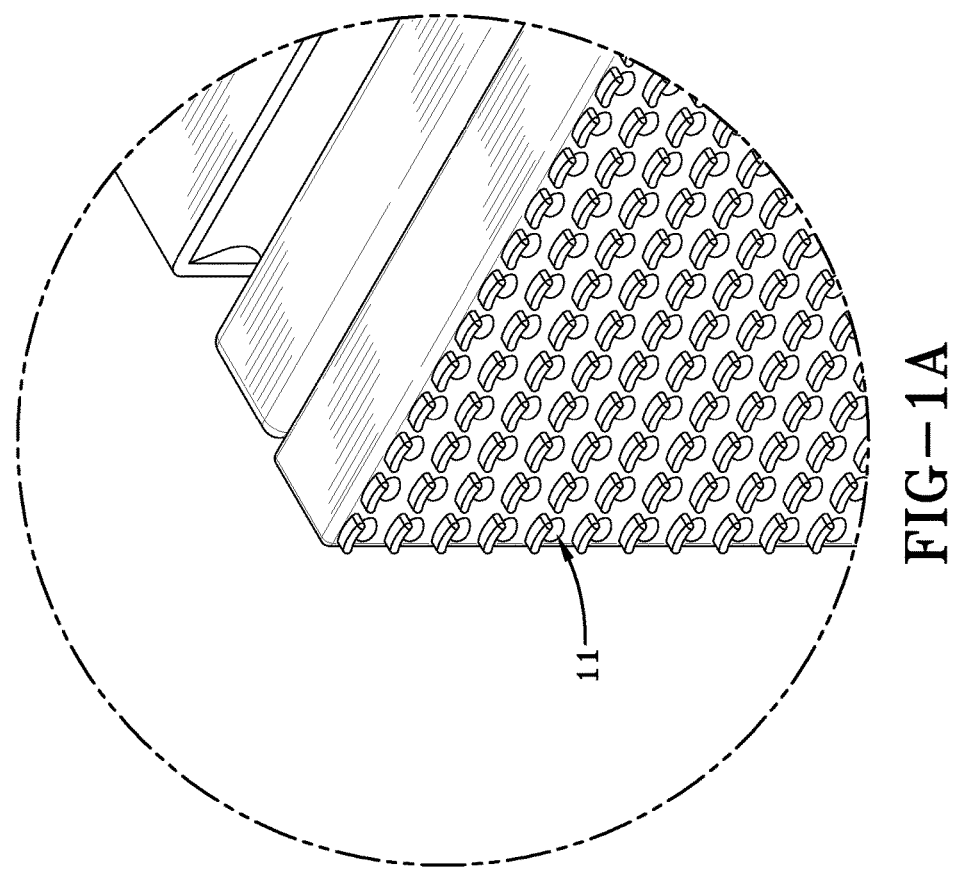
FIG. 1A is a magnified view of a portion of the sign face showing light emitting diodes (LEDs) thereon.
Figure 8:
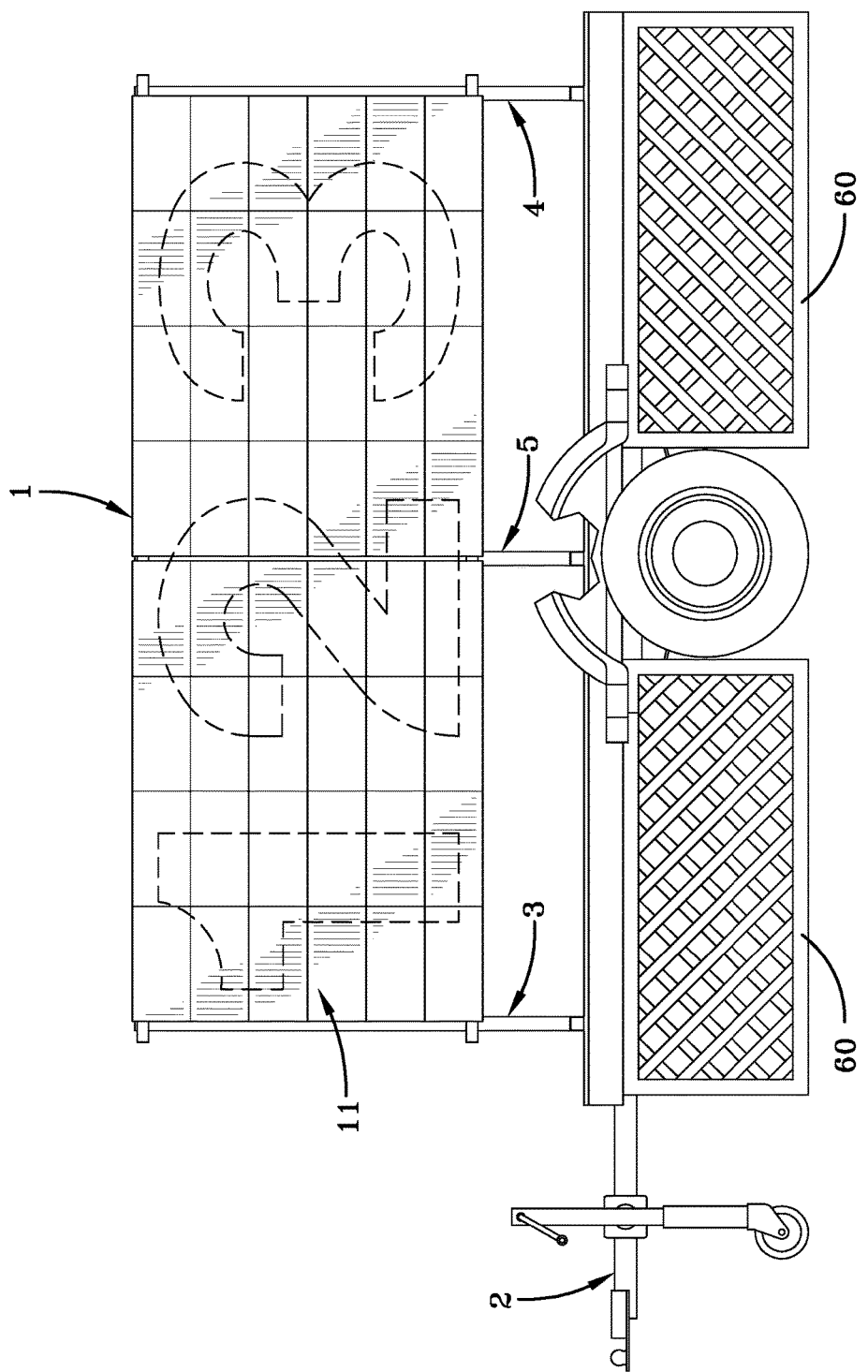
FIG. 8 is a side view of the LED sign of this invention which mounted on a trailer having trailer skirts.

FIG. 1 illustrates one embodiment of this invention wherein the LED sign 1 is mounted on a trailer 2. In this embodiment of the invention LED sign displays are mounted on both side of the trailer 2 with a first U-mount 3 which is located at the front of the LED sign displays, a second U-mount 4 which is located at the back of the LED sign displays, an O-mount 5 which is positioned in the middle of the LED sign displays. The trailer 2 has a license plate 6 which is attached to the trailer 2 with a license plate mounting bracket. The trailer 2 can optionally also have trailer skirts 60 which can be temporarily or permanently attached to the trailer to make it aesthetically more pleasing as illustrated in FIG. 8. Permanently attached trailer skirts should provide sufficient ground clearance so as to avoid contact with the ground during times that the trailed is being pulled by a vehicle. On the other hand, trailer skirts 60 which are mounted in a detachable manner can be removed during periods that the trailer is being transported and reattached during periods that the trailer is in a stationary position. This allows for detachable trailer skirts 60 to extend downwardly virtually all of the way to the surface of the ground.

The O-mount 5, the first U-mount 3, and the second U-mount 4 are adapted to for being attached to the bed 7 of the trailer 2 with an appropriate attachment means, such as screws, bolts, nails, or the like. As show in FIG. 1 each of the U-mounts 3 and 4 include a horizontal base 24 and two vertical support rods 25 and 26 which form the shape of the letter "U". The O-mount 5 also includes a horizontal base 27, two vertical support rods 28 and 29, as well as an upper cross bar 30 (not shown in FIG. 1, but shown in FIG. 3).

In an alternative embodiment of the invention the first U-mount 3 and/or the second U-mount 4 can be replaced with O-mounts. However, doing so adds cost and weight to the LED sign unit and is not typically necessary because the standard configuration which utilized only one O-mount is of sufficient structural integrity for employment in most situations.

In other embodiments of this invention the LED sign display can be affixed to a truck bed or to the body of a vehicle, such as to the roof of a taxi. In another embodiment of this invention the sign display can be mounted to the roof or sides of a bus. However, it should be understood that the LED sign display of this invention can be affixed to any relative flat structure, such as a concrete slab or pedestal on the ground. It can also be secured to an elevated stand for better viewing from distant vantage points.

Figure 2:
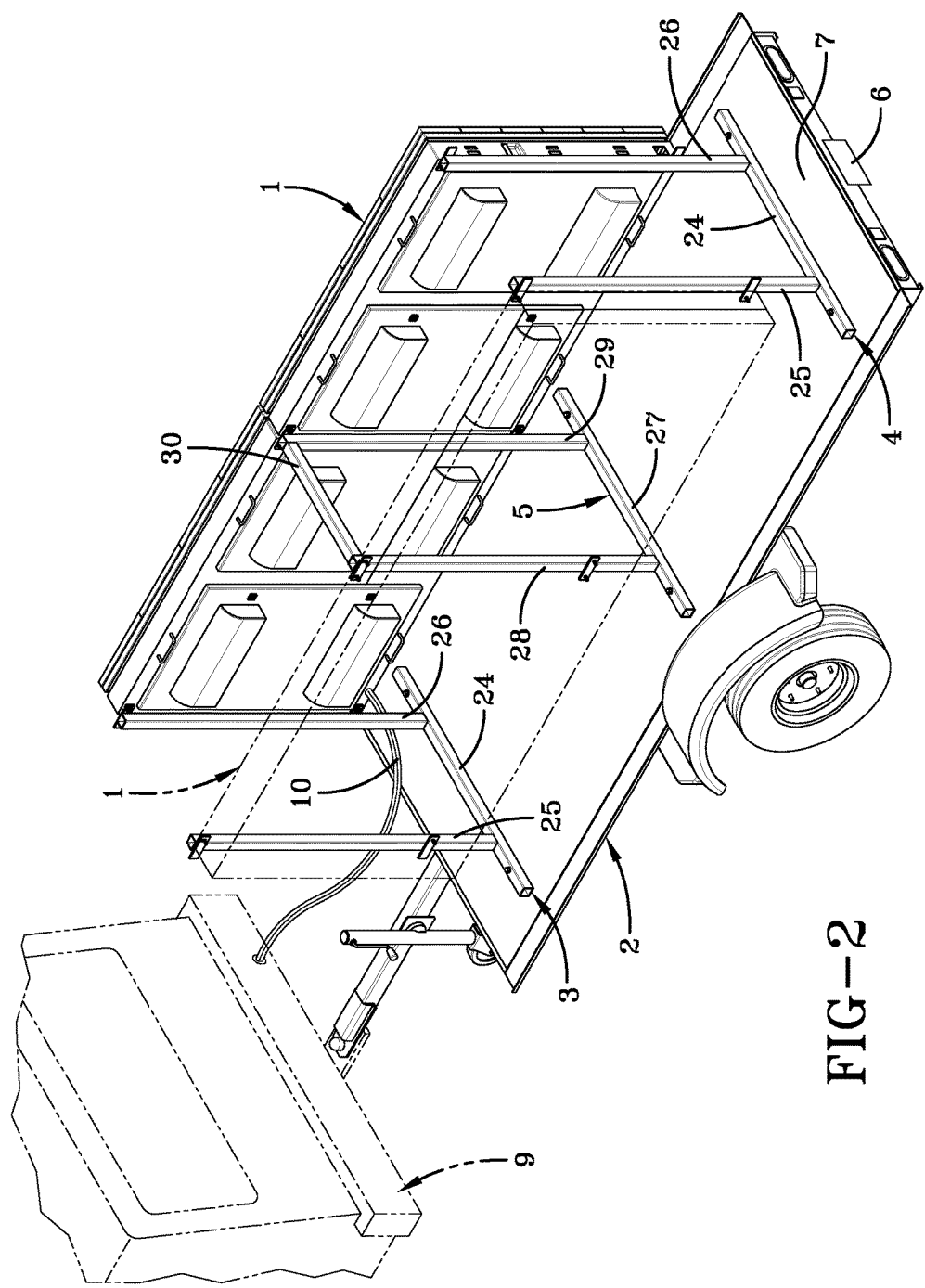
FIG. 2 is a perspective view of the trailer on which the LED sign is mounted wherein the LED sign on the front of the trailer has been cut-away to show the inside of the sign display and the two U-mounts and the O-mount which hold the sign display in place on the trailer.

FIG. 2 shows the first U-mount 3 which is located at the front of the LED sign displays, the second U-mount 4 which is located at the back of the LED sign displays, the O-mount 5 which is positioned in the middle of the LED sign displays. In this embodiment of the invention the U-mounts and the O-mount are attached to the bed 7 of the trailed 2 with bolts 8. In this embodiment of the invention electrical power is provided to the LED sign displays from the vehicle 9 to which the trailer 2 is attached via electrical supply wires 10 which extend from the vehicle 9.

Figure 3:
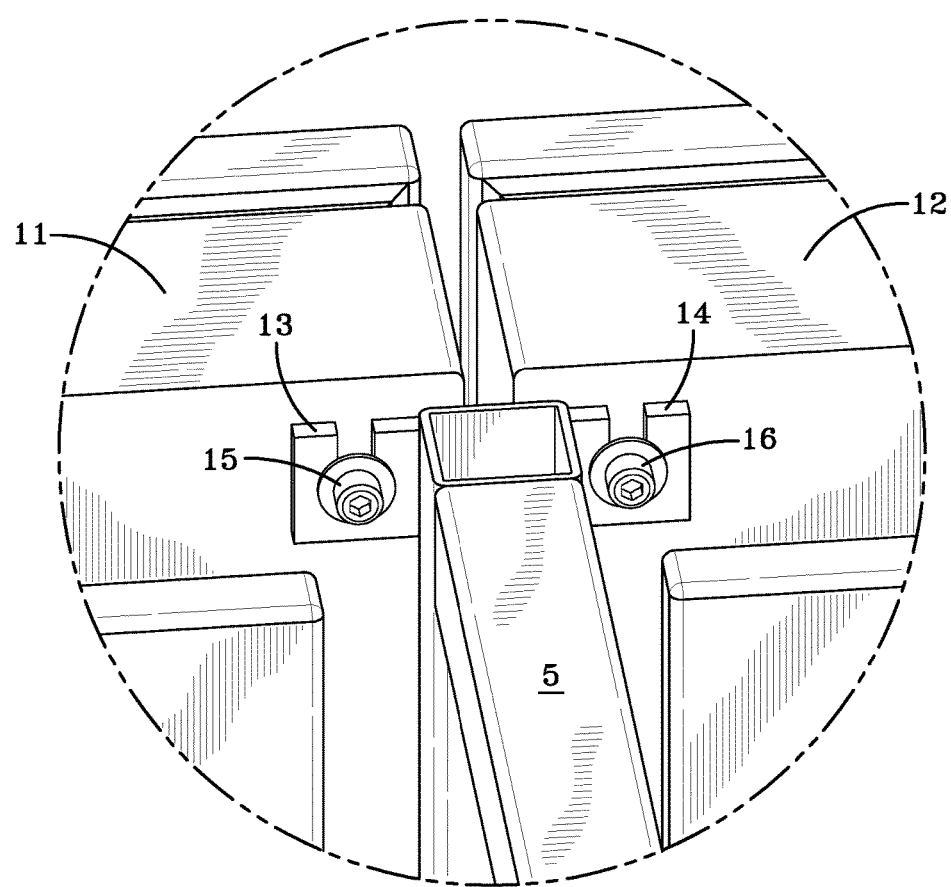
FIG. 3 is a view which shows the mounting brackets on the top of the O-mount of the sign display to which faces of the sign display are affixed.

FIG. 3 illustrates one manner in which the O-mount 5 can be adapted for the upper portion of sign faces 11 and 12 to be mounted thereto. In this embodiment of the invention the O-mount 5 includes bolt hooks 13 and 14 through which bolts 15 and 16 can be screwed to hold the sign faces firmly to the O-mount 5.

Figure 4:
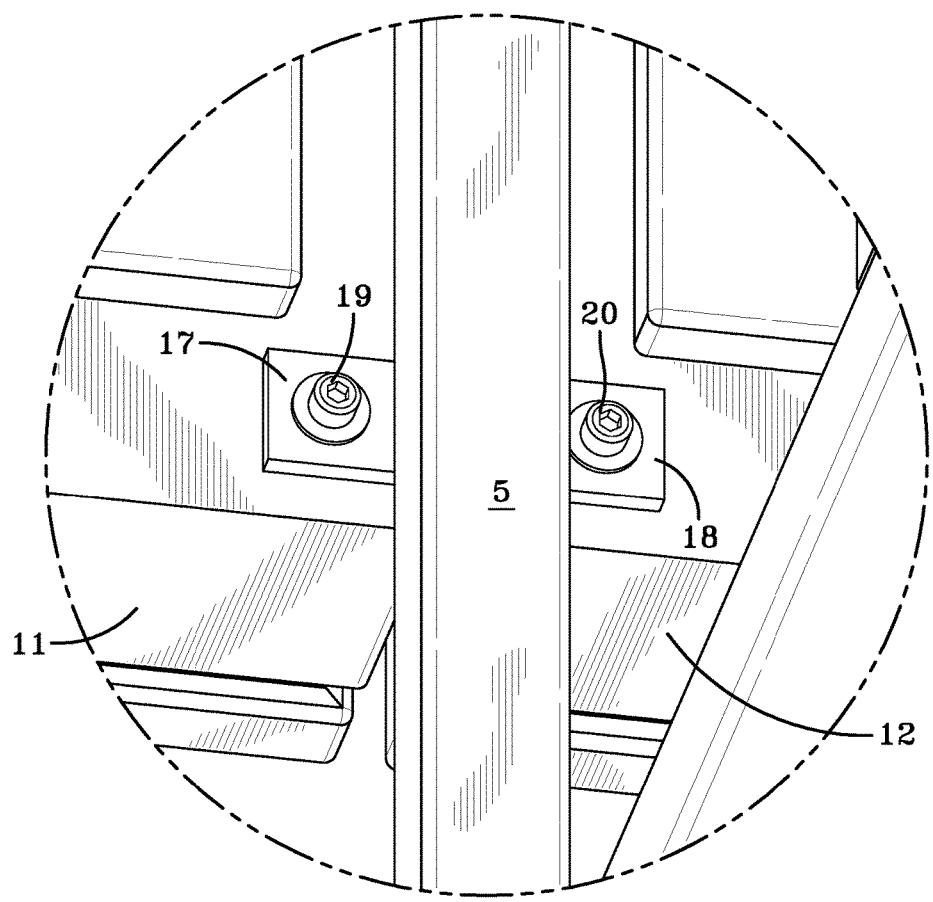
FIG. 4 is a view which shows the mounting brackets on the bottom of the O-mount of the sign display to which faces of the sign display are affixed.

FIG. 4 illustrates one manner in which the O-mount 5 can be adapted for the lower portion of sign faces 11 and 12 to be mounted thereto. In this embodiment of the invention the O-mount 5 includes bolt acceptors 17 and 18 through which bolts 19 and 20 can be screwed to hold the sign faces firmly to the O-mount 5.

Figure 5:
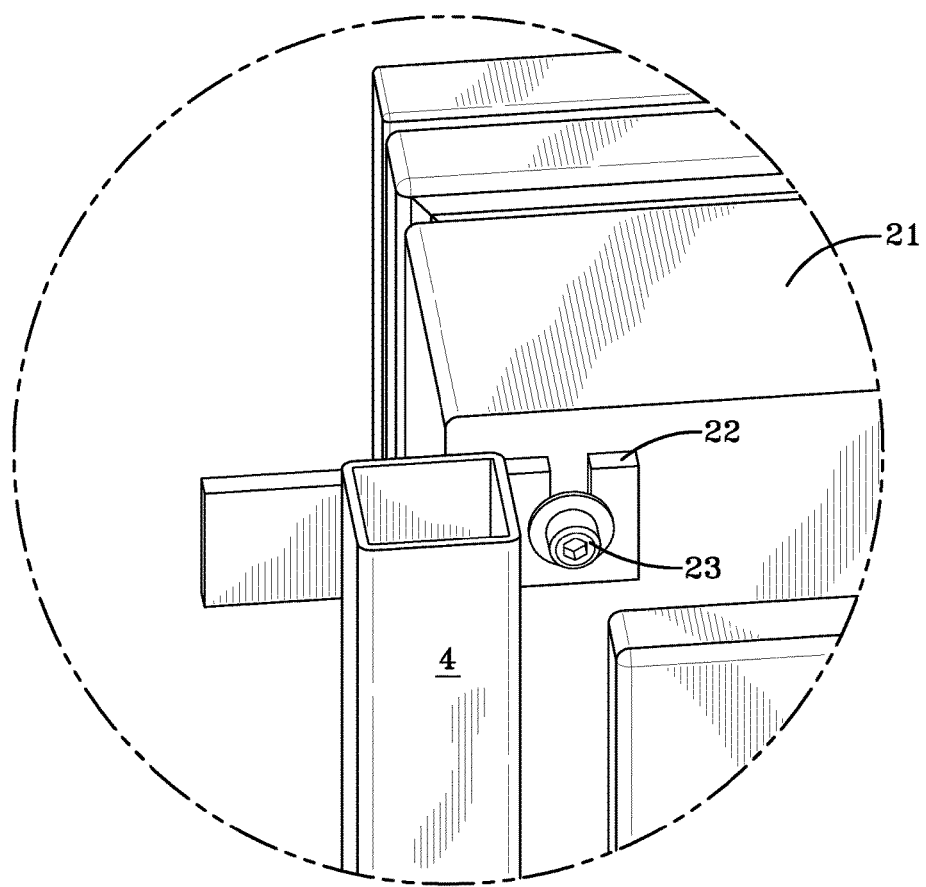
FIG. 5 shows a mounting bracket on the U-mount located on the top right side of the back of the trailer unto which a sign face is attached with a bolt.

FIG. 5 illustrates one manner in which a U-mount 4 can be adapted for the upper portion of a sign face 21 to be mounted thereto. In this embodiment of the invention the U-mount 4 includes a bolt hook 22 through which a bolts 23 can be screwed to hold the sign face 21 firmly to the U-mount 4.

Figure 6:
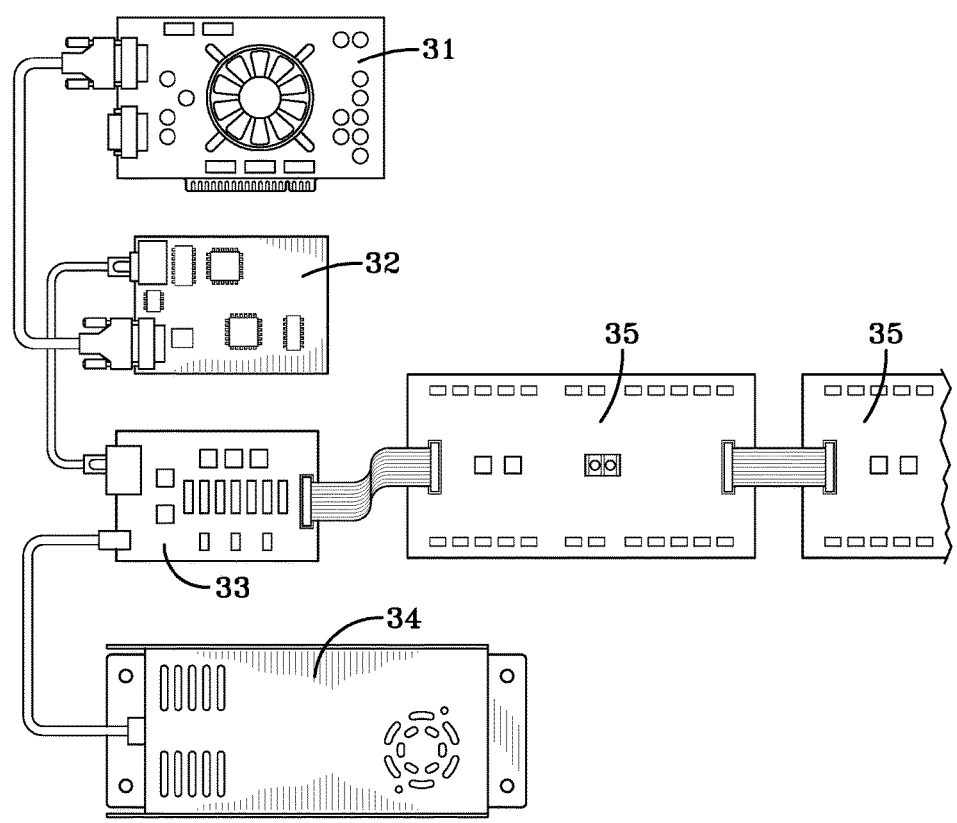
FIG. 6 illustrates the conventional manner of the prior art in which a LED sign is wired to a general purpose computer having a video card and an LED sender card.

FIG. 6 illustrates the conventional manner in which a LED sign is wired to a general purpose computer having a video card and an LED sender card. Only the video card and the LED sender card of the general purpose computer are shown in FIG. 6. The general purpose computer used will, of course, include all of the additional computer components needed to make the computer functional. However, virtually any commercially available general purpose computer having a video card and an LED sender card can normally be used. In any case, the general purpose computer will include a video card 31 and an LED sender card 32, such as a commercially available HUIDU Full-color LED Controller HD-C3 Model: LCC-HD-C3, HIDU LED Control Card HD-C1 led card, or a DBStar (DBS-ASY09C) LED Control Card. The output port of the video card 31 will be in electrical communication with the input of the sender card 32 as illustrated in FIG. 6. The sending card 32 is connected to a receiving card 33 in the LED sign via an ether-net or other appropriate connection. Electrical power is provided to the receiving card 33 from a power supply 34. A sign face 35 or series of sign faces are connected to the receiving card to provide the desired sign display. However, in this conventional LED sign configuration the computer must remain in electrical communication with the receiving card 33 in the sign unit in order for the sign display to continue to provide a display.

Figure 7:
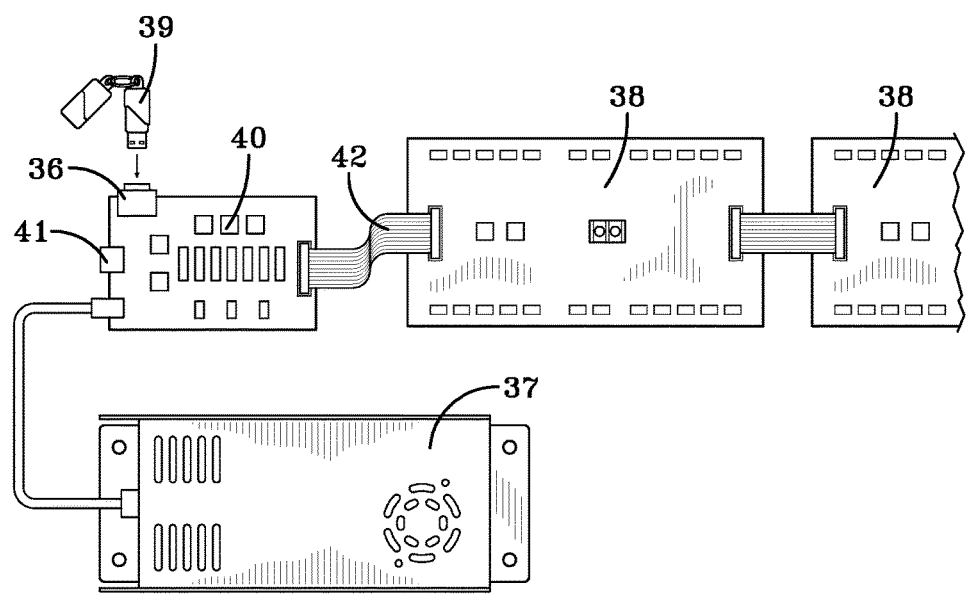
FIG. 7 is a wiring diagram which illustrates the electrical components of the LED signs of this invention, including an LED receiver with USB printer port, a power supply, a display face, and a set of USB flash drives (dongles).

FIG. 7 illustrates the electrical components of the LED signs of this invention, including an LED receiver/controller 40 with USB printer port 36 with an Ethernet port 41, a power supply 37, a display face 38 or series of display faces, and a set of USB flash drives (dongles) 39. The LED receiver/controller 40 is connected to the display face 38 using a flat ribbon cable 42. Commercially available receiver cards can be utilized in the practice of this invention. The receiver card can be further comprised of a video controller. For instance, Colorlight C1S LED Display Player, Novastar PCC80, Novastar PSD100 and Novastar PSD100-WIFI LED receiver cards can be employed in the practice of this invention.

Using a standard computer which is connected to an LED receiver/controller 40 through the Ethernet port 41, the size of the display is programmed into the read only memory of the LED receiver/controller 40 as a one-time setup. The LED receiver/controller 40 will, of course, come with standard SDK files provided by the vendor to enable appropriate input of read-only memory. The data input will, of course, utilize settings consistent with the manufacturer as will be understood by any person having ordinary skill in the art. For example, the height and width of the modules in pixels, the number of inputs, the RGB groups, the decode type and the driver chip are inputted into the LED receiver/controller 40 with the conventional computer as part of the one-time setup. Further identifying the LED receiver/controller 40 to recognize a universal LED module's pattern of on and off and timing therefor is typically inputted as the next step. The next inputted setup information is selecting which color LEDs light up on each of four commands. The colors typically include red, green, black (absence of color) or blue. In a properly configured system, a specific number of lit rows will be displayed on display face 38. Then, a number of rows are inputted with the number of dark rows in between lit rows. At this point, one or multiple pixels will light where selected on the display face 38 to position the message properly. Next, a visual representation of the display face 38 begins to blink one pixel at a time with that pixel being identified on the conventional computer pixel by pixel until the entire display face 38 has been filled appropriately. Those settings are saved to the conventional computer's hard drive. Then, the painting process is completed by counting how many display faces 38 make up the entire sign. These settings are also saved to the conventional computer's hard drive and sent to the LED receiver/controller 40 through the Ethernet port 41. In some cases, these steps can be bypassed by utilizing configuration files provided by the manufacturer of the LED receiver/controller 40.

In programming the USB flash drive 49 design and reproduction software which is generally provided by the LED receiver/controller card manufacturer is used to design and input messages. A conventional USB flash drive 49 can be used for this purpose with the display being designed by inputting messages using a paint screen display. The programming is accordingly saved onto the USB flash drive for subsequent inputting onto the LED receiver/controller 40 through the USB port 36.

As can be seen, the implementation of this invention eliminates the need for a general purpose computer to be committed to the operation of the LED sign. In the practice of this invention a USB flash drive (dongle) is adapted to connect to the receiver through the USB printer port plug. The USB flash drive (dongle) is programmed to reset the erasable, programmable read-only memory of the receiver by erasing any preexisting data which may reside in the read-only memory of the receiver and to program the erasable, programmable read-only memory with auto executing script to set the user defined message to be displayed.

The USB flash drive (dongle) is typically programmed to set the size and the brightness of the user defined message to be displayed. The message can be video, script, animation, pictures, logos, or the like. In any case, the USB flash drive (dongle) sequentially loads data into the read-only memory of the receiver for auto-play allowing for the USB flash drive (dongle) to be removed from the USB printer port plug with the user defined message continuing to be displayed until reprogrammed with a second USB flash drive (dongle) which provides a second user defined message. The USB flash drive (dongle) is a suitable electronic data storage media which is capable of being connected to the receiver through the USB printer port of the receiver. In one embodiment of this invention the USB flash drive (dongle) is a flash drive or a portable hard drive with it being preferred for the USB flash drive (dongle) to be a flash drive. The display faces utilized in the practice of this invention are conventional and commercially available from a variety of manufacturers and include light emitting diodes which are typically red-green-blue diodes. For instance, suitable display faces are commercially available from Linsn (Shenzhen Unit LED Co., Ltd.), Only LED (Shenzhen Only Optoelectronic Technology Co., Ltd), Ryham (Shenzhen Ryham Optoelectronics Co., Ltd.), and Ledman (Ledman Optoelectronic Co., Ltd.).

While certain representative embodiments and details have been shown for the purpose of illustrating the subject invention, it will be apparent to those skilled in this art that various changes and modifications can be made therein without departing from the scope of the subject invention. The embodiments of the invention described herein were chosen in order to explain the principles of the invention and its practical application so as to enable others skilled in the art to utilize the invention and various embodiments and modifications thereof as are suited to the particular use contemplated. Alternative embodiments will become apparent to those skilled in the art to which the present inventions pertains without departing from its spirit and scope. Accordingly, the scope of the present inventions is defined by the appended claims rather than the foregoing description and the exemplary embodiments described therein.

What is claimed is:

1. A sign kit which can be assembled into a sign which can be programmed to display a user defined message, said sign kit being comprised of (1) one or more faces, wherein each face is comprised of a plurality of light emitting diodes; (2) a receiver having erasable, programmable read-only memory and a USB printer port plug; (3) a power supply; and (4) a USB flash drive (dongle) which is adapted to connect to the receiver through the USB printer port plug; wherein the USB flash drive (dongle) is programmed to reset the erasable, programmable read-only memory of the receiver by erasing any preexisting data which may reside in the read-only memory of the receiver and to program the erasable, programmable read-only memory with auto executing script to set the user defined message to be displayed.

2. The sign kit as specified in claim 1 wherein the USB flash drive (dongle) is programmed to set the size and the brightness of the user defined message to be displayed.

3. The sign kit as specified in claim 1 wherein the USB flash drive (dongle) sequentially loads data into the erasable, programmable read-only memory of the receiver for auto-play allowing for the USB flash drive (dongle) to be removed from USB printer port plug with the user defined message continuing to be displayed until reprogrammed with a second USB flash drive (dongle) which provides a second user defined message.

4. The sign kit as specified in claim 1 wherein the light emitting diodes are red-green-blue diodes.

5. The sign kit as specified in claim 1 wherein the receiver is further comprised of a video controller.

6. The sign kit as specified in claim 1 wherein the sign kit is further comprised of a solar power supply.

7. The sign kit as specified in claim 1 wherein the USB flash drive is programmed through a USB port on a general purpose computer conveying the data to define the message through an internet connection from a broadcast center.

8. A mobile sign display kit which is comprised of the sign kit as specified in claim 1, an O-mount which is adapted for being affixed to a trailer, and 2 U-mounts which are adapted for being affixed to the trailer, wherein the O-mount and U-mounts are further adapted for being attached to a sign display which is assembled with the sign kit.

9. The mobile sign display kit as specified in claim 8 which is further comprised of a trailer having a license plate mounting bracket.

10. The mobile sign display kit as specified in claim 7 wherein the USB flash drive is programmed to set the size and the brightness of the user defined message to be displayed.

11. The mobile sign display kit as specified in claim 9 wherein the USB flash drive sequentially loads data into the erasable, programmable read-only memory of the receiver for auto-play allowing for the USB flash drive to be removed from USB printer port plug with the user defined message continuing to be displayed until reprogrammed with a second USB flash drive which provides a second user defined message.

12. The mobile sign display kit as specified in claim 11 wherein the receiver is further comprised of a video controller.

13. The mobile sign display kit as specified in claim 11 wherein the sign kit is further comprised of a solar power supply.

14. A sign unit which can be programmed to display a user defined message, said sign unit being comprised of (i) one or more sign faces, (ii) a receiver, (iii) a power supply, and (iv) a USB flash drive; wherein the sign faces include a data bus, wherein the receiver includes a receiver buss, wherein the data bus of each of the sign faces is electrically connected to the receiver buss through a computer ribbon, wherein the receiver is electrically connected to a power supply, wherein the USB flash drive which is adapted to connecting to the receiver through the USB printer port plug; wherein the USB flash drive is programmed to reset the erasable, programmable read-only memory of the receiver by erasing any preexisting data which may reside in the erasable, programmable read-only memory of the receiver and to program the erasable, programmable read-only memory with auto executing script to set the user defined message to be displayed.

15. The sign unit as specified in claim 14 wherein at least one sign face is attached to an O-mount, wherein at least one sign face is attached to a first U-mount, and wherein at least one sign face is attached to a second U-mount.

16. The sign unit as specified in claim 15 wherein the O-mount is attached to a trailer, wherein the first U-mount is attached to a trailer, and wherein the second U-mount is attached to a trailer.

17. The sign unit as specified in claim 14 wherein the USB flash drive (dongle) is programmed to set the size and the brightness of the user defined message to be displayed.

18. The sign unit as specified in claim 14 wherein the USB flash drive sequentially loads data into the read-only memory of the receiver for auto-play allowing for the USB flash drive to be removed from USB printer port plug with the user defined message continuing to be displayed until reprogrammed with a second USB flash drive which provides a second user defined message.

19. The sign unit as specified in claim 14 wherein the light emitting diodes are red-green-blue diodes, and wherein the receiver is further comprised of a video controller.

20. The sign unit as specified in claim 14 wherein the USB flash drive is programmed through a USB port on a general purpose computer conveying the data to define the message through an internet connection from a broadcast center.

\* \* \* \* \*